L. KRIEGER.
SELF REGULATING ELECTRICALLY PROPELLED VEHICLE WITH LIMITED VARIATIONS IN INTENSITY.
APPLICATION FILED JAN. 10, 1906.
905,713.
Patented Dec. 1, 1908.
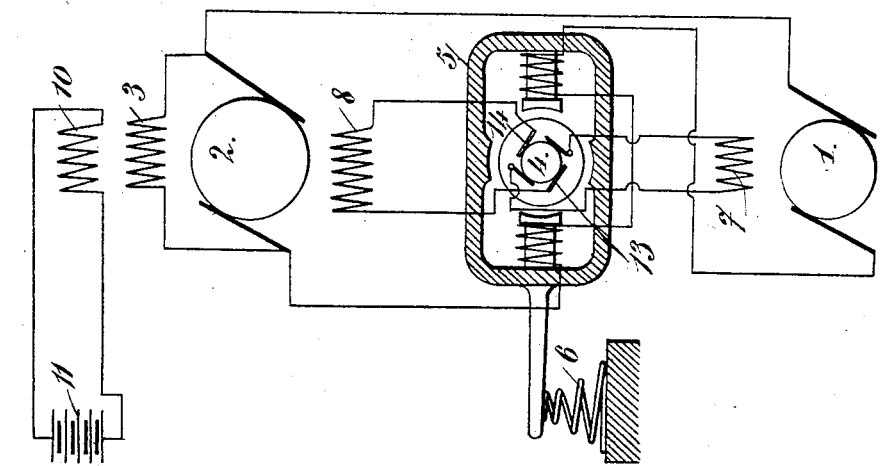
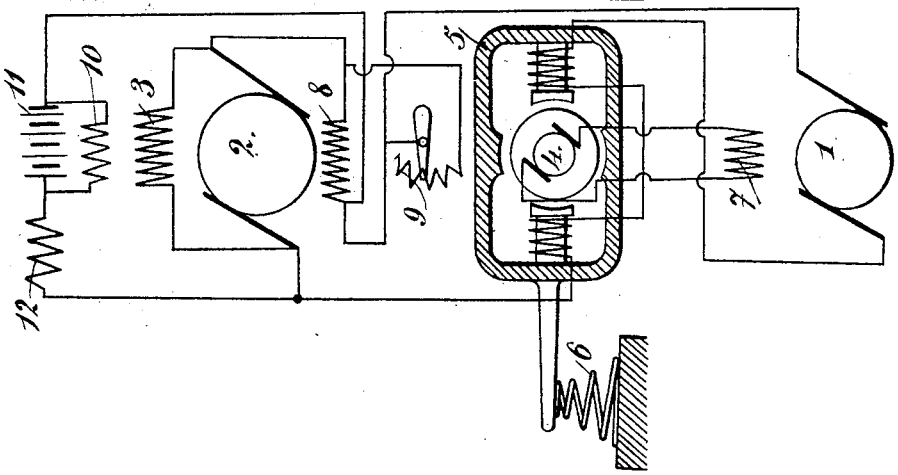
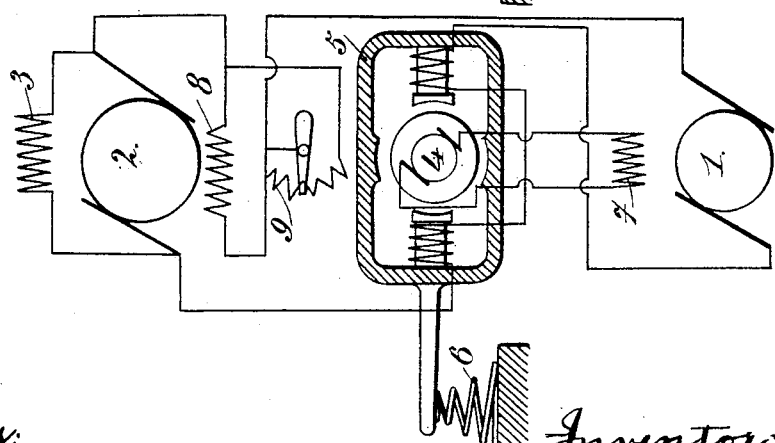
Witnesses:
E. O. Hildebrand
N. Reynolds
Inventor:
Louis Krieger
by Georgii Massie
Attorney

UNITED STATES PATENT OFFICE.

LOUIS KRIEGER, OF PARIS, FRANCE.

SELF-REGULATING ELECTRICALLY-PROPELLED VEHICLE WITH LIMITED VARIATIONS IN INTENSITY.

No. 905,713.  Specification of Letters Patent.  Patented Dec. 1, 1908.

Application filed January 10, 1906. Serial No. 295,399.

*To all whom it may concern:*

Be it known that I, LOUIS KRIEGER, of 45 Boulevard Haussmann, Paris, France, engineer, have invented a new and useful Improvement in Self-Regulating Electrically-Propelled Vehicles with Limited Variations in Intensity, which improvement is fully set forth in the following specification.

This invention has for its object a self regulating electrically driven vehicle in which the variations in intensity, due to the variations of the couple required of the motor are automatically limited to a value lower than that which would normally obtain in an ordinary motor, other things being equal.

The U. S. Patent No. 752,689 of April 14th 1905 indicates how a generator can be made to deliver constant watts within certain limits of variation of the intensity supplied by this generator, the energy furnished by it being delivered to a motor or to several electric motors on the vehicle.

This invention, with the object of reducing the variations of intensity supplied by the generator when very considerable variations of the motor couple are necessitated by the contour of the road or any other cause, provides for the combination of an automatic self regulator, forming the object of the patent above mentioned, with the arrangement of the motor having large variations of its couple which forms the object of my French Patent No. 354,586 of May 24th 1905 for an arrangement automatically limiting the variations of intensity in an electric motor having a very variable couple. The exciter described in this arrangement is then driven by the thermic or other engine which drives the main generator.

The method of carrying out this invention is illustrated in the annexed drawing.

Figure 1 shows diagrammatically a method of applying this arrangement to that shown in Fig. 2 of the drawing annexed to the U. S. Patent No. 752,689 of April 14th 1905. Fig. 2 is a similar diagram corresponding to Fig. 4 of the above mentioned patent. Fig. 3 is a similar diagram, but with the demagnetizing winding traversed by a current supplied by the auxiliary exciter.

The armature 1 of the motor is traversed by the current supplied by the generator 2 which has an excitation 3. In series with this armature 1 is the excitation winding of the exciter 4 which is provided with a movable field magnet 5, compensated in this case by a spring 6. The current delivered by this exciter passes through the field winding 7 of the motor 1. All this portion of the arrangement is that shown in the drawing annexed to the U. S. Patent No. 752,689 of April 14th 1905, and repeated in Figs. 2 and 3 of the present drawing.

The demagnetizing winding 8 of the generator is in Figs. 1 and 2 simply a winding in series with the circuit of the generator 2 and is shunted by the variable resistance 9. In Fig. 2 is shown moreover an auxiliary exciter 10 excited by a source of current 11 a resistance 12 in such a manner as to prevent the field winding of the generator being deprived of current, this is the solution corresponding to Fig. 4 of my former patent No. 752,689 of April 14th 1905. If need be, as is shown in Fig. 3 of the drawings, the demagnetizing winding 8 of the generator 2 may be formed by adding upon the collector of the exciter two brushes placed at 13 and 14 in such a manner that the angular displacement of the field magnet reacts upon the difference of potential at these brushes in the same manner as it reacts upon the excitation of the motor 1 driving the vehicle. It will be seen that under these conditions, the demagnetization also may vary according to then the power of the intensity of the current furnished by the generator.

In the diagrammatic arrangement illustrated in Fig. 3 is shown an excitation 10 excited quite independently by the source of electricity 11 for the purpose of preventing the generator 2 from being at any time deprived of current, Moreover, by placing the brushes at a small distance from the line of the poles, arrangements may be made such that for great intensities, the demagnetization after having been at its maximum at the moment at which the brushes are in the line of the poles diminishes for larger intensities in such a manner as to compensate the armature reaction of the generator, which may intervene at this moment in the same direction as the demagnetization and tend to deprive the machine of current.

In a vehicle equipped in the manner indicated, the rearward movement is obtained with the greatest facility by causing the brushes, which take from the exciter the current exciting the motors, to describe an angle equal to the distance between two poles of contrary sign; the excitation current is in fact under these conditions reversed in the windings of the motor driving the vehicle. Moreover it may be remarked that with the arrangement hereinbefore mentioned being given the very high variation of couple permitted by the arrangement, it is unnecessary to make any connections either in the generator or in the motor in order to vary the speed of the vehicle or vary the value of the couple at the wheels. The breaking of the circuit is moreover unnecessary because it is sufficient to interrupt the main excitation of the generator in order to stop all energy in the generators and the motors. Under these conditions, this arrangement requires the minimum of wires necessary for the transmission of the energy and the minimum of movable contact; moreover, the value of the demagnetization of the generator may be varied by varying the set of the brushes of the exciter corresponding to the demagnetizing winding.

Having thus fully described my invention, what I claim is:—

1. The combination, with a generator having a field winding and an armature winding, of a motor having its armature in series with the generator armature winding, an exciter having an angularly adjustable field, and a field winding in series with the motor armature, a motor field winding arranged to be energized by the exciter armature, and means for compensating the angular adjustment of the exciter field.

2. The combination, with a generator and a motor having their armatures connected in series, a shunt field winding for the generator, an auxiliary field winding for the generator, and a source of current for energizing the latter winding, of an exciter having field windings connected to receive the same current as the motor armature, and a motor field winding energized by the exciter armature.

3. The combination, with a generator arranged to deliver constant watts, of a variable voltage exciter, and a motor having armature and field windings, one of which windings is energized from the generator of constant watts and the other winding from the variable voltage exciter.

4. The combination, with a generator arranged to deliver constant watts, of an exciter, means for adjusting the voltage of the exciter, and a motor having armature and field windings, one of said windings being energized by the generator and the other by the exciter.

5. The combination, with a generator arranged to deliver constant watts, of an exciter having a field whose polar line is adjustable, and a motor having an armature and field windings, one of which is energized by the generator and the other by the exciter.

In testimony whereof I have signed this specification in the presence of two subscribing witnesses.

LOUIS KRIEGER.

Witnesses:
HANSON C. COXE,
GASTON DE NESTSEX.